United States Patent Office 3,767,813
Patented Oct. 23, 1973

3,767,813
USE OF PROSTANOIC ACID DERIVATIVES TO CONTROL PLATELET AGGREGATION
Bengt Samuelsson, Department of Medical Chemistry, Royal Veterinary College, Stockholm 50, Sweden
No Drawing. Original application June 4, 1968, Ser. No. 734,251, now abandoned. Divided and this application May 7, 1971, Ser. No. 141,418
Int. Cl. A61k 27/00
U.S. Cl. 424—318
12 Claims

ABSTRACT OF THE DISCLOSURE

The invention involves prostanoic acid derivatives of the formula:

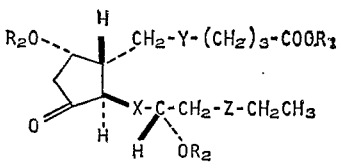

wherein X is —$CH_2CH_2$— or trans-CH=CH—, and both Y and Z are —$CH_2CH_2$—, or wherein X is trans-CH=CH—, Y is cis-CH=CH—, and Z is —$CH_2CH_2$— or cis-CH=CH—, wherein $R_1$ is hydrogen, alkyl, or a cation, and wherein $R_2$ is hydrogen or alkanoyl. These compounds have biological properties which cause them to be useful in the study and treatment of conditions involving blood platelet aggregation and adhesiveness.

This application is a division of my application Ser. No. 734,251, filed June 4, 1968, and now abandoned.

DESCRIPTION OF THE INVENTION

This invention relates to compositions of matter, to methods for producing them, and to methods for using them. In particular, this invention relates to compounds of the formula:

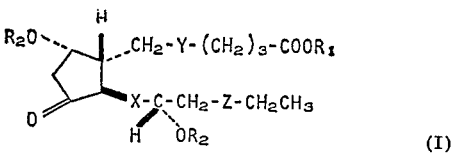

wherein X is —$CH_2CH_2$— or trans-CH=CH—, and both Y and Z are —$CH_2CH_2$—, or wherein X is trans-CH=CH—, Y is cis-CH=CH—, and Z is —$CH_2CH_2$— or cis-CH=CH—, wherein $R_1$ is hydrogen, alkyl of 1 to 8 carbon atoms, inclusive, or a pharmacologically acceptable cation, and wherein $R_2$ is hydrogen or alkanoyl of one to 8 carbon atoms, inclusive. Thus Formula I encompasses compounds of Formulas II, III, IV, and V.

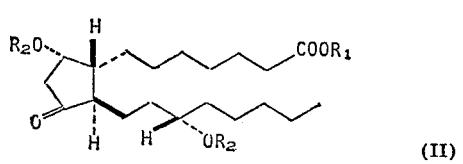

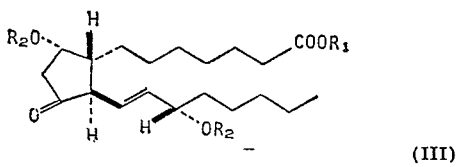

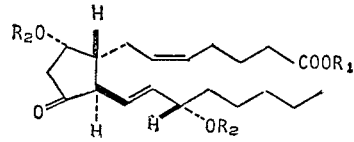

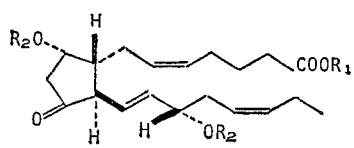

wherein $R_1$ and $R_2$ are as defined above.

These compounds of Formulas I, II, III, IV, and V are derivatives of prostanoic acid to which has been assigned the following structural formula and numbering system:

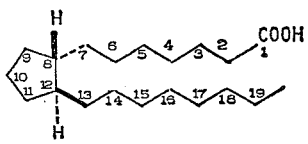

With prostanoic acid as a parent compound, the following are systematic names for these compounds wherein $R_1$ and $R_2$ are hydrogen:

Formula II: 9α,15(S)-dihydroxy-11-oxoprostanoic acid.
Formula III: 9α,15(S)-dihydroxy-11-oxoprosta-trans-13-enoic acid.
Formula IV: 9α,15(S) - dihydroxy - 11 - oxoprosta-cis-5,trans-13-dienoic acid.
Formula V: 9α,15(S)-dihydroxy-11-oxoprosta-cis-5,trans-13,cis-17-trienoic acid.

Examples of alkyl of one to 8 carbon atoms are methyl, ethyl, propyl, butyl, pentyl, hexyl, heptyl, octyl, and isomeric forms thereof.

Examples of alkanoyl of one to 8 carbon atoms, inclusive, are formyl, acetyl, propionyl, butyryl, valeryl, hexanoyl, heptanoyl, octanoyl, and isomeric forms thereof.

Pharmacologically acceptable cations within the scope of $R_1$ in Formulas I, II, III, IV, and V are quaternary ammonium ions or the cationic form of a metal, ammonia, or an amine.

Especially preferred metal cations are those derived from the alkali metals, e.g., lithium, sodium, and potassium, and from the alkaline earth metals, e.g., magnesium and calcium, although cationic forms of other metals, e.g., aluminum, zinc, and iron, are within the scope of this invention.

Pharmacologically acceptable amine cations within the scope $R_1$ in Formulas I, II, III, IV, and V are those derived from primary, secondary, or tertiary amines. Examples of suitable amines are methylamine, dimethylamine, trimethylamine, ethylamine, dibutylamine, triisopropylamine, N-methylhexylamine, decylamine, dodecylamine, allylamine, crotylamine, cyclopentylamine, dicyclohexylamine, benzylamine, dibenzylamine, α-phenylethylamine, β-phenylethylamine, ethylenediamine, diethylenetriamine, and like aliphatic, cycloaliphatic, and araliphatic amines containing up to and including about 18 carbon atoms, as well as heterocyclic amines, e.g., piperidine, morpholine, pyrrolidine, piperazine, and lower-alkyl derivatives thereof, e.g., 1-methylpiperidine, 4-ethylmorpholine, 1-isopropylpyrrolidine, 2-methylpyrrolidine, 1,4-dimethylpiperazine, 2-methylpiperidine, and the like, as well as amines containing water-solubilizing or hydrophilic groups, e.g., mono-, di-, and triethanolamine, ethyldiethanolamine, N-butylethanolamine, 2-amino-1-butanol, 2 - amino - 2-ethyl-1,3-propanediol, 2-amino-2-methyl-1-propanol, tris(hydroxymethyl)aminomethane, N-phenylethanolamine, N - (p - tert - amylphenyl)diethanolamine, galactamine, N-methylglucamine, N-methylglucosamine, epherdine, phylephrine, epinephrine, procaine, and the like.

Examples of suitable pharmacologically acceptable quaternary ammonium cations within the scope of $R_1$ in Formulas I, II, III, IV, and V are tetramethylammonium, tetraethylammonium, benzyltrimethylammonium, phenyltriethylammonium, and the like.

These compounds of Formulas I, II, III, IV, and V are somewhat similar in structure to certain of the natural prostaglandins which are also considered to be derivatives of prostanoic acid, Formula VI. For example, prostaglandin $E_1$ (PGE$_1$) has the following structure.

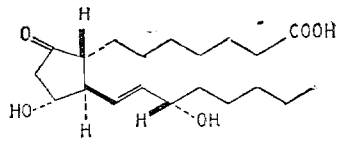

(VII)

The structure of dihydroprostaglandin $E_1$ (dihydro-PGE$_1$) is the same as shown in Formula VII, except that dihydro-PGE$_1$ has no side-chain carbon-carbon double bond. Prostaglandin $E_2$ (PGE$_2$) has the structure shown in Formula VII except that there is a cis carbon-carbon double bond between C–5 and C–6. Prostaglandin $E_3$ (PGE$_3$) has the structure shown in Formula VII except that there are cis carbon-carbon double bonds between C–5 and C–6 and between C–17 and C–18.

Comparison of the formulas of the various natural prostagladins E with Formulas I, II, III, IV, and V shows that these differ in the orientation of the ring oxo atom and the ring hydroxyl group. The natural prostaglandins E are 9-oxo-11-hydroxy compounds, while the compounds of this invention are 9-hydroxy-11-oxo compounds.

There are striking and totally unexpected differences in properties between the compounds of Formulas I, II, III, IV, and V and the natural prostaglandins E. For example, the latter compounds are extremely potent in the stimulation of smooth muscle, as shown, for example, by tests on strips of guinea pig ileum, rabbit duodenum, and gerbil colon. See, for example, Horton, Experientia, 21, 113 (1965). The Formula I, II, III, IV, and V compounds of this invention, on the other hand, have only slight smooth muscle stimulatory activity compared with the natural prostaglandins E. For example, the compound of Formula III wherein $R_1$ and $R_2$ are hydrogen, has only 3 to 10% of the potency of PEG$_1$ (Formula VII) in stimulating the isolated gerbil colon. See Pike et al., Proc. Nobel Symposium II, Stockholm (1966); Interscience Publishers, New York, pp. 161–172 (1967), for measurement methods.

Moreover, the natural prostaglandins E are extremely potent in lowering systemic arterial blood pressure when injected intraveneously. See Horton, cited above. On the other hand, the Formula I, II, III, IV, and V compounds of this invention cause only a slight lowering of systemic arterial blood pressure compared with those natural prostanoic acid derivatives, for example, as measured in anesthetized (pentobarbital sodium) pentolinium-treated rats with indwelling aortic and right heart cannulas. See Pike et al., cited above, for measurement methods.

It is also known that the natural prostaglandins E are highly active in inhibiting blood platelet aggregation and thrombus formation induced by various physical stimuli, e.g., arterial injury, and by various biochemical stimuli, e.g., collagen, ADP, and thrombin, and in causing thrombi to disaggregate, both in vivo and in vitro. See, for example, Emmons et al., British Medical Journal, 2, 468 (1967) and Kloeze, Proc. Nobel Symposium II, Stockholm (1966); Interscience Publishers, New York, pp. 241–252 (1967). The Formula I, II, III, IV, and V compounds of this invention are also highly active in this same regard. For example, the compound of Formula III wherein $R_1$ and $R_2$ are hydrogen has substantially the same activity as PGE$_1$ in inhibiting human platelet adhesion and aggregation, and as a thrombolytic agent. As pointed out above, the natural prostaglandins E are also potent depressors and smooth muscle stimulants. Those latter biological properties will, of course, cause undesired physiological responses in the patient during administration of the substance for the prevention and control of thrombus formation, and for the removal of thrombi. Quite surprisingly and unexpectedly, those undesired physiological responses do not occur during administration of the compounds of this invention for the same puropse. Therefore, the compounds of this invention are useful whenever it is desired to inhibit platelet aggregation, to reduce the adhesive character of platelets, and to remove or prevent the formation of thrombi in mammals, incluuding man, rabbits, rats, and other animals of economic value. For evample, the Formula I, II, II, IV, and V compounds of this invention are useful in the treatment and prevention of myocardial infarcts, to treat and prevent post-operative thrombosis, to promote patency of vascular grafts following surgery, and to treat conditions such as atherosclerosis, arterisoclerosis, blood clotting defects due to lipemia, and other clinical conditions in which the underlying etiology is associated with lipid imbalance or hyperlipidemia.

For the above pjurposes, the compounds of this invention are administered systemically, e.g., intravenously, subcutaneously, intramuscularly, orall, rectally, and in the form of sterile implants for prolonged action. For rapid response, especially in emergency situations, the intravenous route of administration is preferred.

For intravenous injection or infusion, sterile aqueous isotonic solutions or suspensions are preferred. For that purpose, it is preferred because of increased water solubility that $R_1$ in the Formula I, II, III, IV, or V compound be hydrogen or a pharmacologically acceptable cation. For subcutaneous or intramuscular injection, sterile solutions or suspensions of the acid, salt, or ester form in aqueous or nonaqueous media are used. Tablets, capsules, and liquid preparations such as syrups, elixirs, and simple solutions, with the usual pharmaceutical carriers are used for oral administration. For rectal administration, suppositories prepared as known in the art are used. For tissue implants, a sterile tablet or silicone rubber capsule or other object containing or impregnated with the substance is used.

Doses in the range about 0.002 to about 10 mg. per kg. of body weight per day are used, the exact dose depending on the age, weight, and condition of the patient, and on the frequency and route of administration.

The compounds of Formula II, i.e., 9α,15(S)-dihydroxy-11-oxoprostanoic acid and its esters, including alkyl esters and carboxyacylates, are prepared by catalytic hydrogenation or diimide reduction of the corresponding unsaturated Formula III, IV, or V acid or ester.

For catalytic hydrogenation, preferred catalysts are those containing palladium, especially on a carbon carrier. It is also preferred that the hydrogenation be carried out in the presence of an inert liquid diluent, for example, methanol, ethanol, dioxane, ethyl acetate, and the like. Hydrogenation pressures ranging from about atmospheric to about 50 p.s.i., and hydrogenation temperatures ranging from about 10° to about 100° C. are preferred. The amount of hydrogen used will depend on the reactant, one mole being required per mole of Formula III reactant, two moles for a Formula IV reactant, and three moles for a Formula V reactant. The 9α,15(S)-dihydroxy-11-oxo-prostanoic acid or ester product is isolated from the hydrogenation reaction mixture by conventional methods, for example, removal of the catalyst by filtration or centrifugation, followed by evaporation of the solvent. The desired hydrogenation product is purified by conventional techniques, advantageously by methods known to be useful for purification of the prostaglandins, especially thin layer chromatography. See, for example, Greén et al., J. Lipid Research, 5, 117 (1964).

For diimide reduction of the Formula III, IV, or V acid or ester reactant, the general procedure described by Van Tamelen et al., J. Am. Chem. Soc., 83, 3726 (1961) is used. See also Fieser et al., "Topics in Organic Chemistry," Reinhold Publishing Corp., New York, pp. 432–434 (1963), and references cited therein for useful general procedures. The Formula III, IV, or V acid or ester reactant is mixed with a salt of azodiformic acid, preferably an alkali metal salt such as the disodium or dipotassium salt, in the presence of an inert diluent, preferably a lower alkanol such as methanol or ethanol, and preferably in the absence of substantial amounts of water. At least one molecular equivalent of the azodiformic acid salt is used for each molecular double bond equivalent of the reactant, one equivalent being required for a Formula III reactant, two for a Formula IV reactant, and three for a Formula V reactant. The resulting suspension is then stirred, preferably with exclusion of oxygen, and the mixture is made acid, advantageously with a carboxylic acid, e.g., acetic acid. When a Formula III, IV, or V reactant wherein $R_1$ is hydrogen is used, that carboxylic acid reactant also serves to acidify an equivalent amount of the azodiformic acid salt. A reaction temperature in the range about 10° to about 40° C. is usually suitable. Within that temperature range, the reaction is usually complete within less than 24 hours. The desired Formula II product is then isolated by conventional methods, for example, evaporation of the diluent, followed by separation from inorganic materials by solvent extraction. The Formula II product is purified, if desired, as described above.

The compound of Formula III, wherein $R_1$ and $R_2$ are hydrogen, i.e., 9α,15(S)-dihydroxy-11-oxoprosta-trans-13-enoic acid, is prepared by aerobic incubation of all-cis-8,11,14-eicosatrienoic acid with certain aqueous preparations obtained from sheep vesicular glands. Similarly the compounds of Formulas IV and V wherein $R_1$ and $R_2$ are hydrogen, i.e., 9α,15(S) - dihydroxy - 11 - oxoprosta - cis-5,trans-13-dienoic acid and 9α,15(S)-dihydroxy-11-oxoprosta-cis-5,trans-13,cis-17-trienoic acid, are prepared by aerobic incubation of all-cis-5,8,11,14-eicosa-tetraenoic acid and all-cis-5,8,11,14,17-eicosapentaenoic acid, respectively, with the same sheep gland preparations.

Studies have already been made of the aerobic incubation of various long chain unsaturated fatty acids, including the three 20-carbon acids mentioned above, with various preparations obtained from sheep vesicular glands. See, for example, Proc. Nobel Symposium II, Stockholm (1966); Interscience Publishers, New York, pp. 31–56 (1967). Prostanoic acid derivatives and various acyclic products are thereby formed. The prostanoic acid derivatives isolated from those incubation reaction mixtures have usually been either the PGE-type, e.g., $PGE_1$ (Formula VII), $PGE_2$, and $PGE_3$, or the corresponding PGF-type which differ from the PGE-type by having an α-hydroxy at the 9-position rather than an oxo. To illustrate, $PGE_1$ and $PGF_{1\alpha}$ are both obtained from all-cis-8,11,14-eicosatrienoic acid. Similarly, all-cis-5,8,11,14-eicosatetraenoic acid is used to prepare $PGE_2$ and $PGF_{2\alpha}$, and all-cis-5,8,11,14,17-eicosapentaenoic acid to prepare $PGE_3$ and $PGF_{3\alpha}$.

During study of the incubation of all-cis-8,11,14-eicosatrienoic acid with the isolated microsomes of sheep vesicular glands, Nugteren et al., Rec. Trav. Chim., 85, 405 (1966), isolated an incubation product to which they tentatively assigned the structure of Formula III wherein $R_1$ and $R_2$ are hydrogen.

I have now made the surprising discovery that 9α,15(S)-dihydroxy-11-oxoprosta-trans-13-enoic acid is produced in unexpectedly large yields when all-cis-8,11,14-eicosatrienoic acid or a water-soluble salt thereof is incubated with the combination of the enzyme system present in the microsome fraction of sheep vesicular glands plus the particle-free supernatant fraction obtained from aqueous homogenates of those glands. Herein, the term "particle-free" is defined as free of particles which are sedimented by high speed centrifugation, i.e., at about 100,000×g. However, this particle-free supernatant can be prepared by means other than the centrifuge, for example, by filtration through a filter or membrane of appropriate pore size, and the term is not to be construed as limited to preparations obtained with the aid of a centrifuge.

To illustrate this aspect of my invention, small but approximately equal amounts of $PGE_1$ and 9α,15(S)-dihydroxy-11-oxoprosta-trans-13-enoic acid are obtained by incubating all-cis-8,11,14-eicosatrienoic acid with washed microsomes from sheep vesicular glands in the presence of an aqueous buffer, pH 7.5, essentially as described by Nugteren et al. When glutathione ($5 \times 10^{-4}$ molar concentration) is added to such an incubation reaction mixture, the yield of $PGE_1$ increases by a factor about 12, while the yield of 9α,15(S)-dihydroxy - 11 - oxoprosta-trans-13-enoic acid increases only by a factor about 4. On the other hand, and in striking contrast, when all-cis-8,11,14-eicosatrienoic acid is incubated with washed microsomes in the presence of a particle-free supernatant fluid obtained from the sheep glands, the yield of $PGE_1$ increases only by a factor about 9, while the yield of 9α,15(S)-dihydroxy-11-oxoprosta-trans-13-enoic acid increases by a factor about 13. Further, incubation of all-cis-8,11,14-eicosatrienoic acid with sheep gland preparations obtained by centrifugation of an aqueous gland homogenate at about 8,500×g gives substantial amounts of both $PGE_1$ and 9α,15(S)-dihydroxy-11-oxoprosta-trans - 13 - enoic acid. When additional particle-free supernatant is added to such an incubation reaction mixture, the yield of 9α,15(S)-dihydroxy-11-oxoprosta-trans-13-enoic acid increases about 30%, while at the same time, the yield of $PGE_1$ actually decreases. Incubation of all-cis-8,11,14-eicosatrienoic acid with the particle-free supernatant alone yields about the same amount of $PGE_1$ and 9α,15(S)-dihydroxy-11-oxoprosta-trans-13-enoic acid obtained by incubation with the washed microsomes alone.

Thus, it is clear but quite unexpected in view of the prior art that 9α,15(S)-dihydroxy-11-oxoprosta-trans-13-enoic acid is the predominate product when all-cis-8,11,14-eicosatrienoic acid is incubated with the enzyme system of sheep vesicular gland microsomes in the presence of a particle-free supernatant from those glands. Apparently a factor is present in that supernatant which favors the production of this particular Formula III prostanoic acid derivative. This factor is heat-labile since boiling said particle-free supernatant greatly reduces its effectiveness in causing formation of the 9α,15(S)-dihydroxy - 11 - oxoprosta-trans-13-enoic acid while at the same time reducing only slightly its effectiveness in causing formation of $PGE_1$. For that reason, the native particle-free supernatant is used rather than a supernatant treated in such manner as to destroy this necessary factor.

The sheep vesicular gland microsomes are used as such to supply the necessary enzyme system to convert all-cis-8,11,14-eicosatrienoic acid to 9α,15(S)-dihydroxy-11-oxoprosta-trans-13-enoic acid. Alternatively, this enzyme system is separated from the microsomes, and then, if desired, purified further. The enzyme system is effective for the same incubation purpose either after separation or after separation and purification.

Separation of enzyme system from microsomes is accomplished by treating the microsomes with a detergent, preferably a non-ionic detergent, e.g., isooctylphenoxy-polyethoxyethanol. Other detergents, for example, sodium lauryl sulfate, are also used. With one particular nonionic detergent (Cutscum, Fisher Scientific Company, Pittsburgh, Pa.), a 1% detergent concentration gives the maximum solubilization of the enzyme system, although even at 0.1% concentration, more than 50% of the enzyme activity is removed intact from the microsomes. With sodium lauryl sulfate, 0.33% is the optimum concentration for solubilization.

After this solubilization, centrifugation, preferably at about $100,000 \times g$, yields a clear supernatant which is used in place of the microsome suspension as a source of the necessary enzyme system.

The enzyme system is purified by stepwise precipitation of protein from the supernatant obtained by centrifuging microsomes treated with detergent. For example, adding ammonium sulfate to such a supernatant to 30% saturation causes precipitation of protein but leaves the enzyme in the supernatant. Thus non-enzymatic protein is removed. Adding additional ammonium sulfate to the remaining supernatant to 60% saturation causes precipitation of additional protein which contains substantially all of the enzyme activity. The supernatant after 30% ammonium sulfate saturation and the protein precipitate after 60% ammonium sulfate saturation are used in place of the microsome suspension as sources of the necessary enzyme system.

The enzyme system is further purified by dialysis of a solution of the protein precipitated by 60% ammonium sulfate in a dilute slightly alkaline aqueous buffer against the same buffer. That dialyzed solution is used in place of the microsome suspension as a source of the enzyme system.

Still further purification of the enzyme system is accomplished by passing the above-described dialyzed buffer solution through an ion exchanger, preferably a column of a dialkylaminoalkyl-substituted-cellulose. An example of such an ion exchanger is diethylaminoethylcellulose. Essentially all of the enzymatic activity is in the solvent from during that chromatography. Impurities remain on the column. The eluate containing the enzymatic activity is used in place of the microsome suspension as a source of the enzyme system.

All of the above-mentioned alternative enzyme system preparation should be protected with an antioxidant, e.g., a small concentration of hydroquinone, e.g., $5 \times 10^{-4}$ molar. The antioxidant is not as necessary when microsomes are used.

Compounds of Formulas IV and V wherein $R_1$ and $R_2$ are hydrogen, i.e., $9\alpha,15(S)$-dihydroxy-11-oxoprosta-cis-5,trans-13-dienoic acid and $9\alpha,15(S)$-dihydroxy-11-oxoprosta-cis-5,trans-13,cis-17-trienoic acid, are prepared by incubation of 5,8,11,14-eicosatetraenoic acid and 5,8,11,14,17-eicosapentaenoic acid, respectively, with a combination of the enzyme system of the microsomes and the native particle-free supernatant as described above for the incubation of 8,11,14-eicosatrienoic acid. As for the latter incubation, microsomes, or an isolated or isolated and purified form of the enzyme system is used.

Isolation of the desired Formula III, IV, or V compound wherein $R_1$ and $R_2$ are hydrogen from an incubation reaction mixture is accomplished by methods known to the art. One useful procedure is to stop the enzymatic reaction by addition of an organic solvent or solvent system which is at least partly soluble in water. The protein which thereby separates is removed by conventional methods, e.g., centrifugation. The prostanoic acid derivative is then separated by acidification of the supernatant followed by extraction with a lipid solvent, e.g., chloroform. Evaporation of the lipid solvent gives the desired prostanoic acid which is purified by conventional methods, e.g., preparative thin layer chromatography on silica gel.

Esterification of the Formula II, III, IV, or V compound wherein $R_1$ is hydrogen is carried out by interaction of the acid with the appropriate diazohydrocarbon. For example, when diazomethane is used, the methyl esters are produced. Similar use of diazoethane, diazobutane, and 1-diazo-2-ethylhexane, for example, gives the ethyl, butyl, and 2-ethylhexyl esters, respectively.

Esterification with diazohydrocarbons is carried out by mixing a solution of the diazohydrocarbon in a suitable inert solvent, preferably diethyl ether, with the Formula II, III, IV, or V acid reactant, advantageously in the same or a different inert diluent. After the esterification reaction is complete, the solvent is removed by evaporation, and the ester purified if desired by conventional methods, preferably by chromatography. It is preferred that contact of the acid reactants with the diazohydrocarbon be no longer than necessary to effect the desired esterification, preferably about one to about ten minutes, to avoid undesired molecular changes. Diazohydrocarbons are known in the art or can be prepared by methods known in the art. See, for example, Organic Reactions, John Wiley & Sons, Inc., New York, N.Y., vol. 8, pp. 389–394 (1954).

An alternative method for esterification of the carboxyl moiety of Formula II, III, IV, or V reactions comprises transformation of the free acid to the corresponding silver salt, followed by interaction of that salt with an alkyl iodide. Examples of suitable iodides are methyl iodide, ethyl iodide, butyl iodide, isobutyl iodide, tert-butyl iodide, and the like. The silver salts are prepared by conventional methods, for example, by dissolving the acid in cold dilute aqueous ammonia, evaporating the excess ammonia at reduced pressure, and then adding the stoichiometric amount of silver nitrate.

Carboxyacylation of the two hydroxy moieties in the Formula II, III, IV, or V compounds wherein $R_2$ is hydrogen is accomplished by interaction of the hydroxy compound with a carboxylacylating agent, preferably the anhydride of an alkanoic acid of one to 8 carbon atoms, inclusive. For example, use of acetic anhydride gives the corresponding diacetate. Similar use of propionic anhydride, isobutyric anhydride, and hexanoic acid anhydride, for example, gives the corresponding dicarboxyacylates.

The carboxyacylation is advantageously carried out by mixing the hydroxy compound and the acid anhydride, preferably in the presence of a tertiary amine such as pyridine or triethylamine. A substantial excess of the anhydride should be used, preferably about 10 to about 10,000 moles of anhydride per mole of the hydroxy compound reactant. The excess anhydride serves as a reaction diluent and solvent. An inert organic diluent, for example, dioxane, can also be added. It is preferred to use enough of the tertiary amine to neutralize the carboxylic acid produced by the reaction, as well as any free carboxyl groups present in the hydroxy compound reactant.

The carboxyacylation reaction is preferably carried out in the range about 0° to about 100° C. The necessary reaction time will depend on such factors as the reaction temperature, and the nature of the anhydride and tertiary amine reactants. With acetic anhydride, pyridine, and a 25° C. reaction temperature, a 12 to 24-hour reaction time is used.

The carboxyacylated product is isolated from the reaction mixture by conventional methods. For example, the excess anhydride is decomposed with water, and the resulting mixture acidified and then extracted with a solvent such as diethyl ether. The desired carboxyacylate is recovered from the diethyl ether extract by evaporation. The carboxyacylate is then purified by conventional methods, advantageously by chromatography.

The Formula II, III, IV, or V acids ($R_1$=hydrogen) are transformed to pharmacologically acceptable salts by neutralization with appropriate amounts of the corresponding inorganic or organic base, examples of which correspond to the cations and amines listed above. These transformations are carried out by a variety of procedures known in the art to be generally useful for the preparation of inorganic, i.e., metal or ammonium, salts, amine acid addition salts, and quaternary ammonium salts. The choice of procedure depends in part upon the solubility characteristics of the particular salt to be prepared. In the case of the inorganic salts, it is usually suitable to dissolve the Formula II, III, IV or V acid in water containing the stoichiometric amount of a hydroxide, carbonate, or bicarbonate corresponding to the inorganic salt desired. For example, such use of sodium hydroxide, sodium carbonate, or sodium bicarbonate gives a solution of the sodium salt of the prostanoic acid derivative. Evaporation of the water or addition of a water-miscible solvent of moderate polarity, for example, a lower alkanol or a lower alkanone, gives the solid inorganic salt if that form is desired.

To produce an amine salt, the Formula II, III, IV, or V acid is dissolved in a suitable solvent of either moderate or low polarity. Examples of the former are ethanol, acetone, and ethyl acetate. Examples of the latter are diethyl ether and benzene. At least a stoichiometric amount of the amine corresponding to the desired cation is then added to that solution. If the resulting salt does not precipitate, it is usually obtained in solid form by addition of a miscible diluent of low polarity or by evaporation. If the amine is relatively volatile, any excess can easily be removed by evaporation. It is preferred to use stoichiometric amounts of the less volatile amines.

Salts wherein the cation is quaternary ammonium are produced by mixing the Formula II, III, IV, or V acid with the stoichiometric amount of the corresponding quaternary ammonium hydroxide in water solution, followed by evaporation of the water.

The invention can be more fully understood by the following examples.

EXAMPLE 1

$9\alpha,15(S)$-dihydroxy-11-oxoprosta-trans-13-enoic acid

Fat and connective tissue are removed from sheet vesicular glands that were stored at $-20°$ C. for six months. The glands are then transformed to a 30% homogenate (wet weight/volume) in 0.25 molar aqueous sucrose solution. The homogenate is centrifuged at $8500 \times g$ to obtain a preliminary supernatant free of nuclei and mitochondria. This preliminary supernatant is then centrifuged at $105,000 \times g$ for one hour to separate microsomes from a particle-free supernatant. The resulting microsomes are resuspended in a volume of 0.25 molar aqueous sucrose equal to one-half of the original aqueous sucrose volume.

The ammonium salt of all-cis-8,11,14-eicosatrienoic acid (50 mg.) is dissolved in particle-free supernatant from 250 g. of glands, and an aqueous sucrose suspension of microsomes from 500 g. of glands is added. The mixture is then incubated at $37°$ C. for 30 minutes with shaking and exposure to air. The enzymatic reaction is stopped by addition of 7 liters of a mixture of equal volumes of chloroform and methanol. The protein which precipitates is removed by centrifugation. To the clear supernatant is added 3 liters of chloroform and 2 liters of aqueous formic acid (1%). The mixture is inverted several times, and then clarified by centrifugation. The chloroform layer is separated and evaporated to give a residue. Preparative thin layer chromatography of the residue on silica gel G (according to Stahl) with benzene:dioxane:acetic acid (80:20:2), followed by ethanol elution of the material with $R_f$ 0.28 and evaporation of the eluate, gives $9\alpha,15(S)$-dihydroxy - 11 - oxoprosta - trans - 13 - enoic acid. Infrared analysis of this compound shows strong absorption at $5.85\mu$ and $5.78\mu$, and weak absorption at $10.3\mu$.

EXAMPLE 2

$9\alpha,15(S)$-dihydroxy-11-oxoprosta-cis-5,trans-13-dienoic acid

Following the procedure of Example 1 but using the ammonium salt of all-cis-5,8,11,14-eicosatetraenoic acid in place of the ammonium salt of all-cis-8,11,14-eicosatrienoic acid, $9\alpha,15(S)$-dihydroxy-11-oxoprosta-cis-5, trans-13-dienoic acid is obtained.

EXAMPLE 3

$9\alpha,15(S)$-dihydroxy-11-oxoprosta-cis-5,trans-13,cis-17-trienoic acid

Following the procedure of Example 1 but using the ammonium salt of all - cis - 5,8,11,14,17 - eicosapentaenoic acid in place of the ammonium salt of all-cis-8,11,14-trienoic acid, $9\alpha,15(S)$-dihydroxy - 11 - oxoprosta-cis-5, trans-13,cis-17-trienoic acid is obtained.

EXAMPLE 4

$9\alpha,15(S)$ - dihydroxy - 11 - oxoprosta-trans-13-enoic acid

The procedure of Example 1 is followed except that the aqueous sucrose suspension of microsomes is first mixed with 125 ml. of a 5% solution of a non-ionic detergent (isooctylphenoxypolyethoxyethanol; Cutscum, Fisher Scientific Company, Pittsbugh, Pa.) in 0.25 molar aqueous sucrose. The resulting mixture is allowed to stand for 10 minutes, and is then centrifuged at $105,000 \times g$ for 60 minutes. The resulting clear yellow supernatant is collected, diluted to 830 ml. with 0.25 molar aqueous sucrose, mixed with hydroquinone ($5 \times 10^{-4}$ molar), and the solution used in place of the microsome suspension in the incubation described in Example 1. $9\alpha,15(S)$-dihydroxy-11-oxoprosta-trans-13-enoic acid is isolated as described in Example 1.

EXAMPLE 5

$9\alpha,15(S)$-dihydroxy-11-oxoprosta-trans-13-enoic acid

The procedures of Examples 1 and 4 are followed except that the yellow supernatant of Example 4 is mixed with ammonium sulfate to 30% saturation. The mixture is stirred for 15 minute and then centrifuged. The resulting supernatant is mixed with ammonium sulfate to 60% saturation This mixture is stirred 15 minutes and then centrifuged. The resulting precipitate is dissolved in 40 ml. of 0.05 molar aqueous tris-(hydroxymethyl)aminomethane hydrochloride (tris-HCl) buffer, pH 7.5, and the solution is dialyzed against the same buffer for 12 hours. The dialyzed solution is diluted to 800 ml. with 0.25 molar aqueous sucrose, mixed with hydroquinone ($5 \times 10^{-4}$ molar) and the solution used in place of the microsome suspension in the incubation described in Example 1. $9\alpha,15(S)$-dihydroxyl - 11 - oxoprosta-trans-13-enoic acid is isolated as described in Example 1.

EXAMPLE 6

$9\alpha,15(S)$-dihydroxy-11-oxoprosta-trans-13-enoic acid

The procedures of Examples 1, 4, and 5 are followed except that the enzyme system in the dialyzed buffer solution of Example 5 is further purified by ion exchange. Diethylaminoethylcellulose (DE 50, W & R Balston Ltd.) is washed extensively and successively with one molar aqueous sodium hydroxide, one molar aqueous hydrochloric acid, and distilled water, packed into eight 2.2 x 5 cm. columns, and equilibrated for 12 hours against 0.05 molar tris-HCl buffer, pH 7.5. One eighth of the dialyzed buffer solution containing the enzyme system is placed on each column, and the columns are each eluted with the same buffer solution. The enzymatic activity is present in the solvent front of each column. The collected and combined enzyme fractions are diluted to 800 ml. with 0.25 molar aqueous sucrose, mixed with hydroquinone ($5 \times 10^{-4}$ molar) and the solution used in place of the microsome suspension in the incubation described in Example 1. 9α,15(S)-dihydroxy-11-oxoprosta-trans-13-enoic acid is isolated as described in Example 1.

EXAMPLE 7

9α,15(S)-dihydroxy-11-oxoprostanoic acid

A solution of 9α,15(S)-dihydroxy-11-oxoprosta-trans-13-enoic acid (100 mg.) in 8 ml. of ethyl acetate is shaken with hydrogen at about one atmosphere pressure and 25° C. in the presence of 5% palladium on charcoal (15 mg.). One equivalent of hydrogen is absorbed in about 100 minutes. The hydrogenation is stopped, and the catalyst removed by filtration. Evaporation of the filtrate gives a gummy residue which is chromatographed on silica gel with a mixture of ethyl acetate and hexane (3:1), giving 9α,15(S)-dihydroxy-11-oxoprostanoic acid.

Following the procedure of Example 7, the methyl, ethyl, butyl, and 2-ethylhexyl esters of 9α,15(S)-dihydroxy-11-oxoprosta-trans-13-enoic acid are transformed to the methyl, ethyl, butyl, and 2-ethylhexyl esters of 9α,15(S)-dihydroxy - 11 - oxoprostanoic acid, respectively. Also following the procedure of Example 7, the diacetate and methyl ester diacetate of 9α,15(S)-dihydroxy-11-oxoprosta-trans-13-enoic acid are transformed to the diacetate and methyl ester diacetate, respectively, of 9α,15(S)-dihydroxy-11-oxoprostanoic acid.

Also following the procedure of Example 7, 9α,15(S)-dihydroxy-11-oxoprosta-cis-5,trans-13-dienoic acid and 9α,15(S)-dihydroxy - 11 - oxoprosta-cis-5,trans-13,cis-17-trienoic acid are each transformed to 9α,15(S)-dihydroxy-11-oxoprostanoic acid, using 2 and 3 equivalents of hydrogen, respectively.

EXAMPLE 8

9α,15(S)-dihydroxy-11-oxoprostanoic acid

9α,15(S) - dihydroxyl-11-oxoprosta-trans-13-enoic acid (50 mg.) is dissolved in 10 ml. of absolute ethanol. Air is flushed from the reaction vessel with a stream of dry nitrogen gas, and is excluded thereafter by maintaining a slight positive pressure of nitrogen in the reaction vessel. A suspension of 50 mg. of disodium azodiformate in 5 ml. of absolute ethanol is added, and the resulting mixture stirred at about 25° C. and made acid with a few drops of glacial acetic acid. Stirring at 25° C. is continued for 8 hours. The reaction mixture is then evaporated to dryness. The resulting residue is dissolved in a mixture of diethyl ether and water. The diethyl ether layer is separated, dried with anhydrous sodium sulfate, and evaporated at reduced pressure to give 9α,15(S)-dihydroxy-11-oxoprostanoic acid with substantially the same properties as the material prepared according to Example 7.

Following the procedure of Example 8, the methyl, ethyl, butyl, and 2-ethylhexyl esters of 9α,15(S)-dihydroxy-11-oxoprosta-trans-13-enoic acid are transformed to the methyl, ethyl, butyl, and 2-ethylhexyl esters of 9α,15(S)-dihydroxy-11-oxoprostanoic acid, respectively. Also following the procedure of Example 8, the diacetate and methyl ester diacetate of 9α,15(S)-dihydroxy-11-oxoprosta-trans-13-enoic acid are transformed to the diacetate and methyl ester diacetate, respectively, of 9α,15(S)-dihydroxy-11-oxoprostanoic acid.

Also following the procedure of Example 8, 9α,15(S)-dihydroxy-11-oxoprosta-cis-5,trans-13-dienoic acid and 9α,15(S)-dihydroxy - 11 - oxoprosta-cis-5,trans-13,cis-17-trienoic acid are each transformed to 9α,15(S)-dihydroxy-11-oxoprostanoic acid, using twice and three times the specified amount of disodium azodiformate, respectively.

EXAMPLE 9

Methyl 9α,15(S)-dihydroxy-11-oxoprosta-trans-13-enoate

9α,15(S) - dihydroxy-11-oxoprosta-trans-13-enoic acid (2 mg.) is dissolved in a mixture of methanol and diethyl ether (1:1). A diethyl ether solution of diazomethane (about 200 mg.) is added, and the mixture is allowed to stand at about 25° C. for 5 minutes. The reaction mixture is then evaporated to dryness to give methyl 9α,15(S)-dihydroxy-11-oxoprosta-trans-13-enoate. Infrared analysis of this compound shows strong absorption at $5.78\mu$ and weak absorption at $10.3\mu$.

Following the procedure of Example 9 but using diazoethane, diazobutane, and 1-diazo-2-ethylhexane, in place of the diazomethane, there are obtained the ethyl, butyl, and 2-ethylhexyl esters, respectively, of 9α-15(S)-dihydroxy-11-oxoprosta-trans-13-enoic acid.

Also following the procedure of Example 9, 9α-15(S)-diacetoxy-11-oxoprosta-trans - 13 - enoic acid, 9α-15(S)-dihydroxy - 11 - oxoprostanoic acid, 9α-15(S)-dihydroxy-11 - oxoprosta-cis-5,trans-13-dienoic acid, and 9α,15(S)-dihydroxy - 11 - oxoprosta-cis-5,trans-13,cis-17-trienoic acid are each transformed to the corresponding methyl, ethyl, butyl, and 2-ethylhexyl esters.

EXAMPLE 10

9α,15(S)-diacetoxy-11-oxoprosta-trans-13-enoic acid

9α,15(S) - dihydroxy - 11 - oxoprosta-trans-13-enoic acid (2 mg.) is mixed with acetic anhydride (0.5 ml.) and pyridine (0.5 ml.), and the mixture is allowed to stand at 25° C. for 18 hours. The reaction mixture is then cooled with ice, diluted with water, and acidified with dilute hydrochloric acid to pH 1. That mixture is extracted three times with diethyl ether. The diethyl ether extracts are combined, and washed successively with dilute hydrochloric acid, dilute aqueous sodium bicarbonate solution, and water. The diethyl ether is then evaporated to give 9α,15(S)-diacetoxy-11-oxoprosta-trans-13-enoic acid.

Following the procedure of Example 10, but replacing the acetic anhydride with propionic anhydride, isobutyric anhydride, and hexanoic acid anhydride, the corresponding dicarboxyacyl derivatives of 9α,15(S)-dihydroxy-11-oxoprosta-trans-13-enoic acid are obtained.

Also following the procedure of Example 10, methyl 9α,15(S)-dihydroxy - 11 - oxoprosta-trans13-enoate, 9α,15(S)-dihydroxy-11-oxoprostanoic acid, 9α,15(S)-dihydroxy-11-oxoprosta-cis-5,trans-13 - dienoic acid, and 9α,15(S) - dihydroxy - 11 - oxoprosta-cis-5,trans-13,cis-17-trienoic acid are each transformed to the corresponding 9α,15(S) - diacetoxy, dipropionyloxy, diisobutyloxy, and dihexanoyloxy esters.

EXAMPLE 11

Sodium 9α,15(S)-dihydroxy-11-oxoprosta-trans-13-enoate

9α,15(S) - dihydroxy-11-oxoprosta-trans - 13 - enoic acid (2 mg.) is dissolved in 3 ml. of water-ethanol (1:1). The solution is cooled to about 10° C., and is neutralized with an equivalent amount of 0.1 N aqueous sodium hydroxide solution. Evaporation to dryness gives sodium 9α,15(S)-dihydroxy-11-oxoprosta-trans-13-enoate.

Following the procedure of Example 11 but using potassium hydroxide, calcium hydroxide, tetramethylammonium hydroxide, and benzyltrimethylammonium hydroxide in place of sodium hydroxide, there are obtained the corresponding salts of 9α,15(S) - dihydroxy-11-oxoprosta-trans-13-enoic acid.

Also following the procedure of Example 11, 9α,15(S)-diacetoxy - 11 - oxoprosta-trans - 13 - enoic acid, 9α,15(S)-dihydroxy-11-oxoprostanoic acid, 9α,15(S)-dihydroxy-11-oxoprosta-cis-5,trans - 13 - dienoic acid, and 9α,15(S)-dihydroxy - 11 - oxoprosta-cis-5,trans-13,cis-17-trienoic acid are each transformed to the corresponding sodium, potassium, calcium, tetramethylammonium, and benzyltrimethylammonium salts.

EXAMPLE 12

A sterile aqueous solution for intramuscular or intravenous injection, containing in each ml. 10 mg. of sodium 9α,15(S)-dihydroxy - 11 - oxoprosta-trans-13-enoate, is prepared from the following ingredients:

|  | G. |
|---|---|
| Sodium 9α,15(S) - dihydroxy-11-oxoprosta-trans-13-enoate | 10 |
| Lactose, hydrous | 50 |
| Sodium biphosphate, anhydrous | 1.6 |
| Sodium phosphate, exsiccated | 17.46 |
| Methylparaben | 1.3 |
| Propylparaben | 0.15 |
| Water for injection, q.s. 1000 ml. | |

One milliliter is injected intramuscularly into an adult male just prior to surgery, and the same amount every four hours for two days following surgery to prevent postoperative thrombosis.

EXAMPLE 13

A sterile suspension for intramuscular injection, containing in each ml. 100 mg. of 9α,15(S)-dihydroxy-11-oxoprosta-trans-13-enoic acid, is prepared from the following ingredients:

|  | G. |
|---|---|
| 9α,15(S)-dihydroxy-11-oxoprosta-trans - 13 - enoic acid, micronized | 100 |
| Peanut oil gel, q.s. 1000 ml. | |

A male adult suffering from a myocardial infarct is given a one milliliter intramuscular injection once a day for ten days.

EXAMPLE 14

A sterile aqueous solution for intramuscular or intravenous injection, containing in each ml. 0.05 mg. of sodium 9α,15(S)-dihydroxy - 11 - oxoprosta-trans-13-enoate, is prepared from the following ingredients:

|  | G. |
|---|---|
| Sodium 9α,15(S)-dihydroxy - 11 - oxoprosta-trans-13-enoate | 0.5 |
| Methylparaben, U.S.P. | 18 |
| Propylparaben, U.S.P. | 2 |
| Water for injection, q.s. 10,000 ml. | |

The solution is administered to a 50-kilogram female adult as an intravenous infusion at a rate of 1 ml. per minute for 24 hours immediately following surgery and vascular graft to maintain patency.

EXAMPLE 15

1000 tablets for oral use, each containing 100 mg. of 9α,15(S)-dihydroxy-11-oxoprosta-trans-13-enoic acid, are prepared from the following ingredients:

|  | G. |
|---|---|
| 9α,15(S)-dihydroxy-11-oxoprosta-trans - 13 - enoic acid, micronized | 100 |
| Starch, U.S.P. | 25 |
| Lactose | 100 |
| Talc, U.S.P. | 20 |
| Calcium stearate | 2.5 |

The acid and lactose are mixed well and granulated with syrup-starch paste. To the dried granules is added a mixture of the remainder of the ingredients, and the final mixture is compressed into tablets of the proper weight.

EXAMPLE 16

1000 two-piece hard gelatin capsules for oral use, each containing 50 mg. of 9α,15(S)-dihydroxy-11-oxoprosta-trans-13-enoic acid, are prepared from the following ingredients:

|  | G. |
|---|---|
| 9α,15(S)-dihydroxy-11-oxoprosta-trans - 13 - enoic acid, micronized | 50 |
| Lactose | 50 |
| Corn starch | 100 |
| Talc, U.S.P. | 20 |
| Magnesium stearate powder | 20 |

EXAMPLE 17

A syrup for oral use, containing 5 mg. of potassium 9α,15(S)-dihydroxy-11-oxoprosta-trans - 13 - enoate in each teaspoonful (5 ml.) is prepared from the following ingredients:

| Potassium 9α,15(S)-dihydroxy-11-oxoprosta - trans-13-enoate | g. | 1 |
|---|---|---|
| Preservative | g. | 2.5 |
| Glycerine | ml. | 150 |
| Tragacanth powder | g. | 7.5 |
| Flavor | ml. | 2 |
| Sucrose | g. | 400 |
| Purified water, q.s. 1000 ml. | | |

An essentially pure compound within the scope of Formulas I, II, III, IV, and V is a compound essentially free of pyrogens, antigens, proteins, lipids, tissue fragments, and cellular debris, and essentially free of prostanoic acid derivatives with oxo at the 9-position, and hydroxy or carboxyacyloxy at the 11-position, e.g., PGE$_1$, PGE$_2$, or PGE$_3$. The former impurities interfere with the use of the compounds of this invention for pharmacological purposes. The latter impurities, PGE$_1$, for example, will cause undesirable physiological responses, as discussed above.

What is claimed is:

1. A method for combating thrombus formation which consists essentially of administering systemically to mammals in need of such therapy an effective amount for reduction of blood platelet aggregation of a compound of the formula:

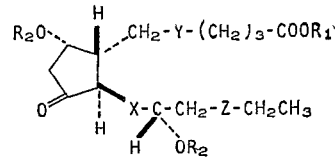

wherein X is —CH$_2$CH$_2$— or trans-CH=CH—, and both Y and Z are —CH$_2$CH$_2$—, or wherein X is trans-CH=CH—, Y is cis-CH=CH—, and Z is —CH$_2$CH$_2$— or cis-CH=CH—, wherein R$_1$ is hydrogen, alkyl of 1 to 8 carbon atoms, inclusive, or a pharmacologically acceptable cation, and R$_2$ is hydrogen or alkanoyl of one to 8 carbon atoms, inclusive.

2. A method according to claim 1 wherein said compound, X is trans-CH=CH—, Y and Z are —CH$_2$CH$_2$—, R$_1$ is hydrogen or a pharmacologically acceptable cation, and R$_2$ is hydrogen.

3. A method according to claim 2 wherein the administration is intravenous.

4. A method according to claim 3 wherein the dosage is in the range about 0.002 mg. to about 10 mg. per kg. of body weight per day.

5. A method for combating adhesion of blood platelets to vascular intima which consists essentially of administering systemically to mammals in need of such therapy an effective amount for reduction of blood platelet adhesiveness of a compound of the formula:

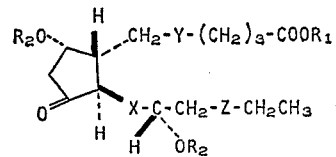

wherein X is —CH$_2$CH$_2$— or trans-CH=CH—, and both Y and Z are —CH$_2$CH$_2$—, or wherein X is trans-CH=CH—, Y is cis-CH=CH—, and Z is —CH$_2$CH$_2$— or cis-CH=CH—, wherein $R_1$ is hydrogen, alkyl of 1 to 8 carbon atoms, inclusive, or a pharmacologically acceptable cation, and $R_2$ is hydrogen or alkanoyl of one to 8 carbon atoms, inclusive.

6. A method according to claim 5 wherein said compound, X is trans-CH=CH—, Y and Z is —CH$_2$CH$_2$—, $R_1$ is hydrogen or a pharmacologically acceptable cation, and $R_2$ is hydrogen.

7. A method according to claim 6 wherein the administration is intravenous.

8. A method according to claim 7 wherein the dosage is in the range about 0.002 mg. to about 10 mg. per kg. of body weight per day.

9. A method for causing disaggregation of thrombi which consists essentially of administering systemically to mammals in need of such therapy an effective amount to cause thrombus disaggregation of a compound of the formula:

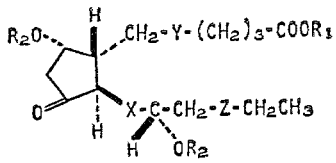

wherein X is —CH$_2$CH$_2$— or trans-CH=CH—, and both Y and Z are —CH$_2$CH$_2$—, or wherein X is trans-CH=CH—, Y is cis-CH=CH—, and Z is —CH$_2$CH$_2$— or cis-CH=CH— wherein $R_1$ is hydrogen, alkyl of 1 to 8 carbon atoms, inclusive, or a pharmacologically acceptable cation, and $R_2$ is hydrogen or alkanoyl of one to 8 carbon atoms, inclusive.

10. A method according to claim 9 wherein said compound, X is trans-CH=CH—, Y and Z are —CH$_2$CH$_2$—, $R_1$ is hydrogen or a pharmacologically acceptable cation, and $R_2$ is hydrogen.

11. A method according to claim 10 wherein the administration is intravenous.

12. A method according to claim 11 wherein the dosage is in the range about 0.002 mg. to about 10 mg. per kg. per day.

References Cited
UNITED STATES PATENTS 3,290,226  12/1966  Beal et al. _____ 195—30
3,296,091   1/1967  Beal et al. _____ 195—30

OTHER REFERENCES

Pickles: Bio. Rev., vol. 42 (1967), pp. 635 and 636.
Sekhar: J. of Medicinal Chem., vol. 13 (1970), pp. 39–44.

SAM ROSEN, Primary Examiner

U.S. Cl. X.R.

424—305

UNITED STATES PATENT OFFICE
CERTIFICATE OF CORRECTION

Patent No. 3,767,813        Dated October 23, 1973

Inventor(s) Bengt Samuelsson

It is certified that error appears in the above-identified patent and that said Letters Patent are hereby corrected as shown below:

Column 3, line 7, "epherdine, phylephrine" should read -- ephedrine, phenylephrine, --; line 55, "PEG$_1$" should read -- PGE$_1$ --. Column 4, line 25, "I, II, II, IV, and V" should read -- I, II, III, IV, and V --; line 35, "orall," should read -- orally, --. Column 7, lines 37-38, "in the solvent from during" should read -- in the solvent front during --. Column 12, line 44, "diisobutyloxy," should read -- diisobutryloxy, --.

Signed and Sealed this

Twenty-eighth Day of June 1977

[SEAL]

Attest:

RUTH C. MASON
*Attesting Officer*

C. MARSHALL DANN
*Commissioner of Patents and Trademarks*